US008967525B2

(12) United States Patent
Schneider et al.

(10) Patent No.: US 8,967,525 B2
(45) Date of Patent: Mar. 3, 2015

(54) HELICOPTER WITH A TRANSVERSE DUCT

(71) Applicant: Airbus Helicopters Deutschland GmbH, Donauworth (DE)

(72) Inventors: Sascha Schneider, Unterhaching (DE); Dieter Schimke, Unterhaching (DE); Christian Wehle, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 12 days.

(21) Appl. No.: 13/909,209

(22) Filed: Jun. 4, 2013

(65) Prior Publication Data
US 2013/0327881 A1    Dec. 12, 2013

(30) Foreign Application Priority Data
Jun. 8, 2012    (EP) ..................... 12400020

(51) Int. Cl.
B64C 27/00    (2006.01)
B64C 27/82    (2006.01)

(52) U.S. Cl.
CPC .......... *B64C 27/82* (2013.01); *B64C 2027/8254* (2013.01)
USPC ..................... 244/17.21; 244/1 N; 244/17.19; 416/203; 415/119

(58) Field of Classification Search
USPC ..................... 244/17.21, 17.19, 1 N; 416/203; 415/119
See application file for complete search history.

(56) References Cited

U.S. PATENT DOCUMENTS

| 5,131,604 A | | 7/1992 | Yoerkie | |
| 5,454,691 A | * | 10/1995 | Henri et al. | ................. 415/209.3 |
| 5,566,907 A | | 10/1996 | Marze | |
| 5,634,611 A | | 6/1997 | Marze | |
| 7,959,105 B2 | * | 6/2011 | Marze | ......................... 244/17.19 |
| 8,286,908 B2 | * | 10/2012 | Kebrle et al. | ............... 244/17.19 |
| 2009/0014581 A1 | | 1/2009 | Kebrle | |
| 2013/0119185 A1 | * | 5/2013 | Botti et al. | .................. 244/17.21 |
| 2013/0170985 A1 | * | 7/2013 | Altmikus et al. | .................. 416/3 |

FOREIGN PATENT DOCUMENTS

| EP | 0680871 A1 | 11/1995 |
| EP | 0680873 A1 | 11/1995 |
| EP | 0680874 A1 | 11/1995 |
| EP | 1778951 A2 | 5/2007 |
| WO | 2006110156 A2 | 10/2006 |
| WO | WO 2006110156 A3 * | 2/2008 |

OTHER PUBLICATIONS

Search Report and Written Opinion; Application No. EP 12400020; dated: Jan. 28, 2013.

* cited by examiner

*Primary Examiner* — Christopher P Ellis
(74) *Attorney, Agent, or Firm* — Brooks Kushman P.C.

(57) ABSTRACT

A helicopter with a longitudinal axis and with a tail portion (1) with a transverse duct (6) and a drive shaft (23) inside a drive shaft fairing (14) for an aerodynamic and acoustic optimized counter-torque device (2) supported within said transverse duct (6).

20 Claims, 3 Drawing Sheets

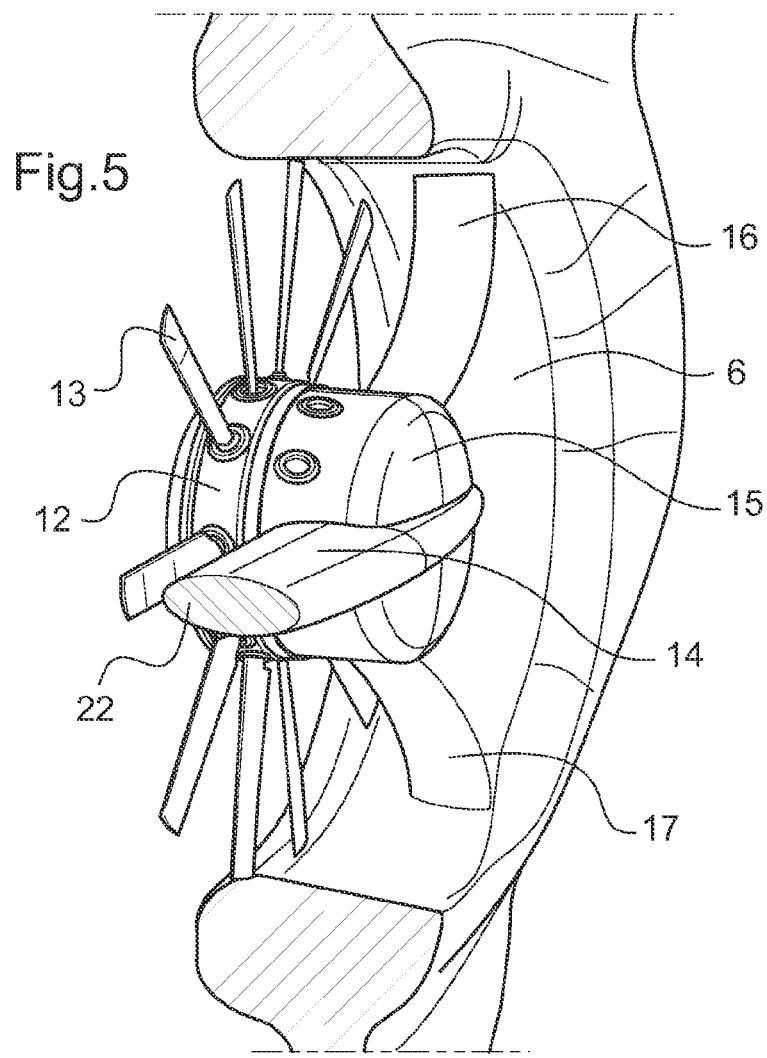
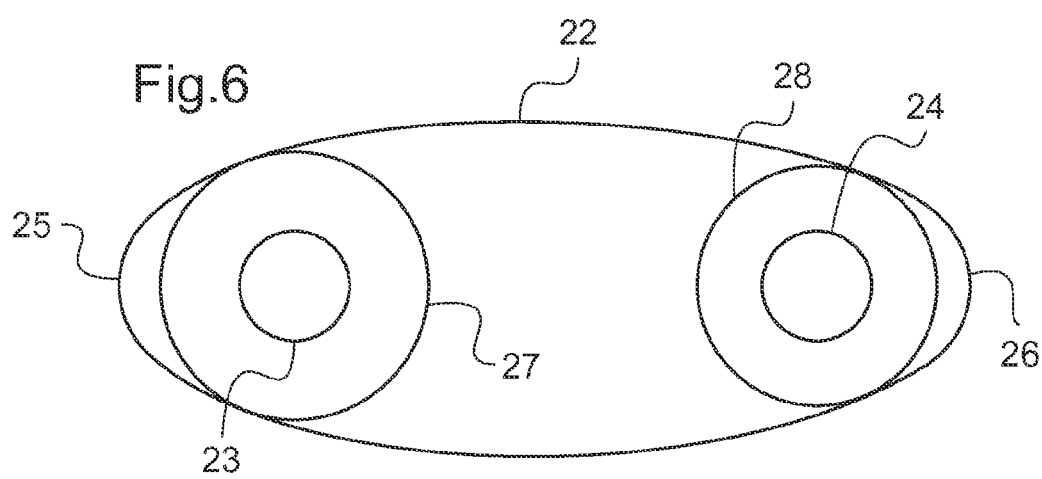

HELICOPTER WITH A TRANSVERSE DUCT

CROSS REFERENCE TO RELATED APPLICATIONS

This application claims priority to European patent application No. EP 12 400020.9 filed Jun. 8, 2012, the disclosure of which is incorporated in its entirety by reference herein.

BACKGROUND OF THE INVENTION (1) Field of the Invention

The invention is related to a helicopter with a counter-torque device supported within a transverse duct with the features of the preamble of the claim 1. Said counter-torque devices supported within a transverse duct are known as so called Fenestron.

(2) Description of Related Art

Growing ecological awareness draws more and more attention to further improvements of helicopter components and in this specific case of Transverse duct based anti-torque systems, especially with the object of reducing any noise emission to increase the acceptance of helicopters in the population.

For the understanding of the phenomena of rotor-stator interactions, especially predicting the tonal noise due to wake interactions, knowledge is required of the periodic loads induced on stator vanes of said counter-torque device. Two distinct effects are usually considered. The first effect is related to interceptions of periodic trains of viscous wake velocity defects from the rotor blades with the stator vanes. These velocity disturbances produce fluctuating lift forces at the stator vanes which radiate as an array of dipole sources and account for harmonic noise components. The second effect deals with stator broadband interaction noise which is a result of turbulent outflow of the rotor producing random fluctuating lift on the stator.

The document EP0680873 A1 discloses a tail rotor with a multi-bladed variable-pitch rotor, mounted coaxially inside an air flow channel surrounded by a housing containing a flow rectifier. The rotor blades move perpendicular to the axis of the channel and have an angular distribution round the rotor's axis with an irregular azimuthal modulation determined from a formula based on the number of blades. The azimuthal modulation of the rotor blades corresponds basically to a degraded sinusoidal law, according to which the angular position of one blade varies by a maximum of +/−5° relative to a fixed angular position. The air flow rectifier is in the form of a stator with fixed blades positioned so that they straighten out the air flow from the rotor, forming a flow parallel to the rotor's axis.

The document EP0680874 A1 discloses a vane with a hollow metal central part forming its main vane section and the vane root and vane tip are each arranged as an end fitting equipped with at least one transverse tab for fastening the vane. The method of manufacture consists in extruding a hollow metal section of cross-section corresponding to the aerodynamic profile of the vane, in cutting off a section portion of length not substantially less than the span of the vane, and in arranging each end of the section portion as an end fitting with at least one fastening tab, either by machining and deformation of the ends of the section portion, or by fitting end fittings attached to its ends.

The document EP 1 778 951 B1 describes a ducted fan for a helicopter with a transverse duct and a counter-torque device supported within the duct. The counter-torque device includes a rotor rotatable mounted within the duct and a stator fixedly mounted within the duct downstream from the rotor. The rotor includes a rotor hub having a rotor axis, and rotor blades extending from the hub. The Rotor blades have a modulated angular distribution about the rotor axis. The stator includes a stator hub, and a plurality of stator vanes distributed around the stator hub. The stator vanes are angularly modulated around the stator hub.

BRIEF SUMMARY OF THE INVENTION

The main objective of the present invention is to further improve the noise characteristics of a helicopter with a transverse duct, particularly to further improve the noise characteristics of a helicopter with a transverse duct in various flight states.

The solution is provided with a helicopter with a transverse duct with the features of the preamble of the claim 1.

According to the invention a helicopter with a longitudinal axis and with a tail portion is provided with a transverse duct for a counter-torque device supported within said duct. Said counter-torque device includes a rotor rotatable mounted within said duct. Said rotor includes a rotor hub having a rotor axis and rotor blades extending from said hub. According to the invention the rotor is mounted about the rotor axis, which is tilted about 1°, particularly within a range between −20° to +45°, around a rotation axis. Said rotation axis is parallel offset relative to the longitudinal axis of the inventive helicopter, the origin of said rotation axis is in the center of the rotor and said rotation axis is directed to the tail of the helicopter. Said rotor blades have a modulated angular distribution around said rotor axis. Said counter-torque device further includes a stator fixedly mounted within said duct and offset along said rotor axis from said rotor. Said stator includes a plurality of stator vanes distributed around a gearbox fairing. Said stator vanes are angularly modulated around said gearbox fairing such that the interferences between the rotor and the stator are limited by avoiding that any angular difference between two rotor blades corresponds to an angular difference between two stator blades and/or an aerodynamic drive shaft fairing encompassing a drive shaft originating from a main gear box and ending in a tail rotor gearbox inside the gearbox fairing.

The aerodynamics of the drive shaft fairing is optimized by improving the shape of the airfoil and by reducing the dimension of the drive shaft fairing in radial direction from the gearbox fairing towards the transverse duct. Said drive shaft drivingly engages with the rotor. A control rod inside the drive shaft fairing controls the pitch angle of the rotor blades. Said control rod originates at least indirectly from pedals in a cockpit of the helicopter. The rotor axis is substantially coaxial with the duct. The maximum number of stator vanes of the inventive helicopter is preferably six, four or more preferably two. The stator vanes of the inventive helicopter are configured to either carry tension or compression depending on their geometrical position in the transverse duct and/or the flight state. The key features of the inventive helicopter allowing an advanced low-noise transverse duct design are as follows:

Phase modulation of the Transverse duct rotor,
Reduction of the interferences between the transverse duct rotor and stator by reducing the number of stator vanes and by optimizing the azimuthal ($\theta_v$) and radial positions ($v_1$) of the transverse duct stator vanes,
Reduction of the interferences between the transverse duct rotor and the transverse duct drive shaft fairing by optimizing the shape of the fairing to avoid obstruction in the duct, and Maximization of the distance between the transverse duct rotor and stator, for instance by tilting the transverse duct stator vanes out of the rotor plane and/or by aerodynamically optimizing the shape of the leading edge of the transverse duct stator vanes.

The advantages of the present invention comprise further improvements of the transverse duct based counter-torque system, especially the advanced low noise transverse duct stator design with reduced noise emissions and therefore increased acceptance of helicopters in the population. Moreover the reduced number of transverse duct stator vanes results in lower production and maintenance expenditure. Efficient and economic helicopters allow an improved image, marketing and benefits compared to competitors.

According to a preferred embodiment of the invention the respective distances between the rotor plane of the transverse duct rotor and any points on leading or trailing edges between a root and a tip at the transverse duct of the stator vanes of the invention are greater than the distances between the plane of the transverse duct rotor and any points on a straight line between said root and said tip at the transverse duct of the leading or trailing edges of the stator vanes. A maximized distance for any points on the trailing edges of the stator vanes of the invention is defined by the width of the shroud geometry, namely said trailing edges of the stator vanes of the invention are limited within a silhouette defined by said shroud of the inventive helicopter.

According to a further preferred embodiment of the invention the azimuthal positions and the incline of said two transverse duct stator vanes relative to any of the rotor blades are respectively given by $\theta_{v\text{-}01}=140°$, $v_{1\text{-}01}=25°$ and $\theta_{v\text{-}02}=255°$, $v_{1\text{-}02}=25°$ for reduced interferences between the transverse duct rotor and stator at optimized azimuthal ($\theta_v$) and radial ($v_1$) distribution of the transverse duct stator vanes. Positive values of $v_1$ may be in the opposite direction from the direction of rotation of the rotor or in direction of rotation of the rotor.

According to a further preferred embodiment of the invention leading and trailing edges of the stator vanes are parabolic for reduced noise emission.

According to a further preferred embodiment of the invention the parabolic shape of the leading edge of the stator vane is defined using three points, a first point being defined at the root of the respective stator vane, a second point at the stator vane tip depending on the first point and an angle $v_2$ and a third point defined in between the first two points, preferable in the middle section of the respective stator vane. The respective distances between the plane of the transverse duct rotor and the first point and the third point are each maximized with the constraint of preventing the trailing edge of the stator vane from protruding from the shroud geometry. The trailing edge distribution of the stator vanes arise from the spanwise chord distribution, being constant in a preferred fulfillment mode.

According to a further preferred embodiment of the invention the stator vanes are tilted with an angle $v_2=5°\pm2°$ relative to a rotor plane.

According to a further preferred embodiment of the invention the first point is closer to the rotor plane than the second point.

According to a further preferred embodiment of the invention the trailing edge of the aerodynamic and acoustic optimized drive shaft fairing is rounded for reduced aerodynamic and acoustic interferences. Said flow is principally through the transverse duct from the rotor to the transverse duct stator or vice versa from the transverse duct stator to the transverse duct rotor, depending on the flight state of the helicopter.

BRIEF DESCRIPTION OF THE SEVERAL VIEWS OF THE DRAWINGS

A preferred embodiment of the invention is presented with reference to the following description and to the attached drawings.

FIG. 5 shows a cross sectional view of the drive shaft fairing in the tail portion of the helicopter according to the invention, and FIG. 6 shows a schematic cross sectional view of the drive shaft and control rod inside the drive shaft fairing of FIG. 5.

DETAILED DESCRIPTION OF THE INVENTION

Figure 1:
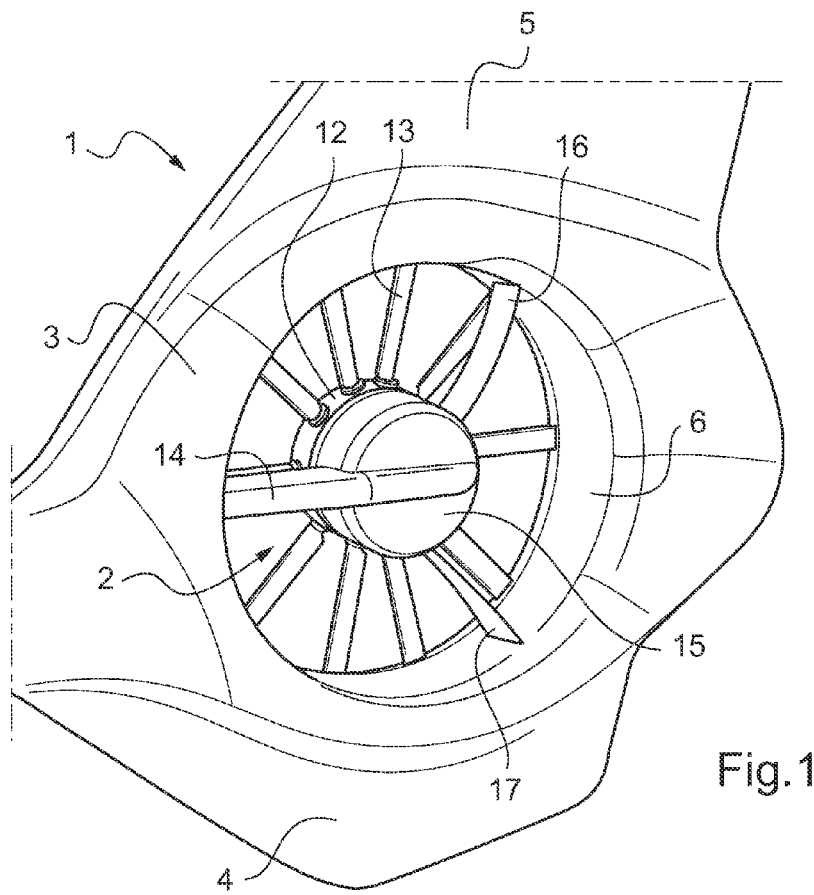
FIG. 1 shows a spherical view of a tail portion of a helicopter according to the invention.

FIG. 1 illustrates a transverse duct-type tail portion 1 of a helicopter (not shown). The transverse duct-type tail portion 1 comprises a shroud 3, a bumper 4 and a fin 5. Further the transverse duct-type tail portion 1 includes a counter-torque device 2 that is structured to counter the torque created by rotation of a main rotor of the helicopter for purposes of balancing the helicopter in terms of yaw. The counter-torque device 2 is supported within a transverse duct 6 that extends through the shroud 3 of the tail portion 1.

The transverse duct 6 has a generally circular shape and comprises a rotor, defining a rotor plane by the rotor blades 13. Air flows through the transverse duct 6 of the counter-torque device 2.

The counter-torque device 2 includes a stator with stator vanes 16, 17, a drive shaft fairing 14 and a gearbox fairing 15.

Ten rotor blades 13 are attached to a rotor hub 12 with a rotor axis. Said ten rotor blades 13 are angularly uneven distributed on the rotor hub 12. The rotor blades 13 define a rotor plane tilted about 1°, but up to a possible range between −20° to +45° around a rotation axis 18 (see FIG. 2, 3). The rotation axis 18 is aligned with and parallel offset relative to the longitudinal axis of the helicopter or aligned with and parallel offset relative to a drive shaft. Said rotation axis 18 faces the direction of the tail of the helicopter and the positive tilt of the rotor axis is defined in mathematically positive sense (right hand rule) with regard to said rotation axis 18.

Figure 2:
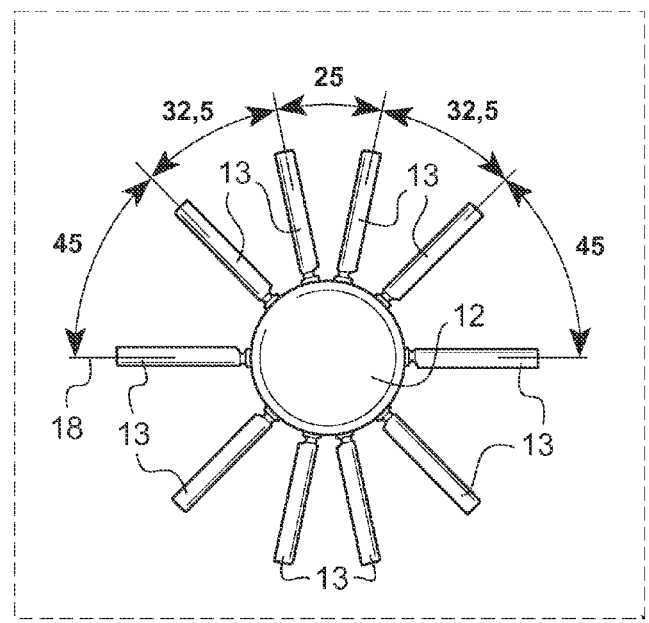
FIG. 2 shows a frontal view of a phase modulated rotor of the helicopter according to the invention.

According to FIG. 2 corresponding features are referred to with the references of FIG. 1. The ten rotor blades 13 are distributed around the rotor hub 12 using phase modulation with respective angles as indicated. Phase modulation describes the technique of reshaping the noise-frequency spectrum. The geometric positions of the transverse duct rotor blades 13 are distributed using the sinusoidal modulation law. EP 1 778 951 B1, the contents of which is enclosed in the present description, presents the phase modulation. The geometric positions of originally equally spaced rotor blades 13 are modified about their original positions in a sinusoidal amplitude pattern according to:

$$\theta'_b = \theta_b + \Delta\theta \cdot \sin(m \cdot \theta_b)$$

where $\theta_b$ is the $b^{th}$ rotor blade position in an evenly spaced arrangement, $\theta'_b$ is the $b^{th}$ rotor blade position after re-arrangement, m is the number of times the modulation cycle is repeated in one revolution and $\Delta\theta$ is the modulation amplitude, i.e. the maximum blade angle change. The defining parameters of the sinusoidal modulation law are the parameters m and $\Delta\theta$. For a better distribution of the acoustic energy the parameter m is as small as possible. Due to the sensitivity of the human ear only m=1 or 2 are interesting. The parameter $\Delta\theta$ should be as large as possible, depending on for instance constructive constraints, loads and/or performance.

The arrangement of the ten rotor blades 13 uses m=2 and $\Delta\theta=9.42°\pm3.0°$ or uses m=2 and $\Delta\theta=5.73°\pm3.4°$ with four upper radial rotor blades 13 being symmetric with respect to four lower radial rotor blades 13 relative to two radial rotor blades 13 arranged along the rotation axis 18. Furthermore the variants of said arrangement also include an 8-bladed rotor using m=2 and $\Delta\theta=10.75°\pm3.75°$ or $\Delta\theta=8.96°\pm5.0°$.

Figure 3:
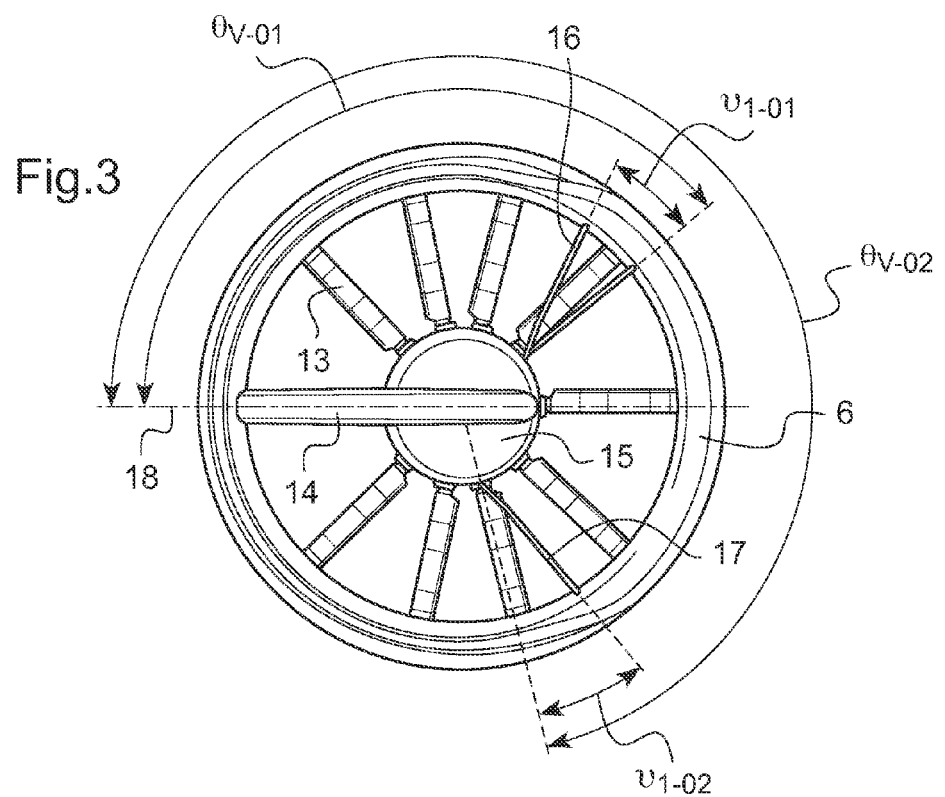
FIG. 3 shows a frontal view of the phase modulated rotor of FIG. 2 in a counter-torque device of the helicopter according to the invention.

According to FIG. 3 corresponding features are referred to with the references of FIG. 1, 2. The positions of a first stator vane 16 and a second stator vane 17 of the stator 11 within the transverse duct are respectively defined by two parameters, i.e. the azimuthal position $\theta_v$ with regard to the rotation axis 18 and the inclination $v_1$ to the radial direction from the gearbox fairing 15 towards the transverse duct 6. Positive values of $v_1$ are defined in the opposite direction from the direction of rotation of the rotor. The azimuthal position relative to the rotation axis 18 of the first stator vane 16 is $\theta_{v-01}=140°$ and the inclination $v_1$ to the radial direction from the gearbox fairing 15 towards the transverse duct 6 of said first stator vane 16 is $v_{1-01}=25°$. The azimuthal position relative to the rotation axis 18 of the second stator vane 17 is $\theta_{v-02}=255°$ and the inclination $v_1$ to the radial direction from the gearbox fairing 15 towards the transverse duct 6 of said second stator vane 17 is $v_{1-02}=25°$.

The azimuthal position relative to the rotation axis 18 of the first and second stator vanes 16, 17 can vary in the range of $\theta_v=\pm40°$. The inclination of the first and second stator vanes 16, 17 to the radial direction from the gearbox fairing 15 towards the transverse duct 6 can vary in the range of $v_1=\pm20°$.

Figure 4:
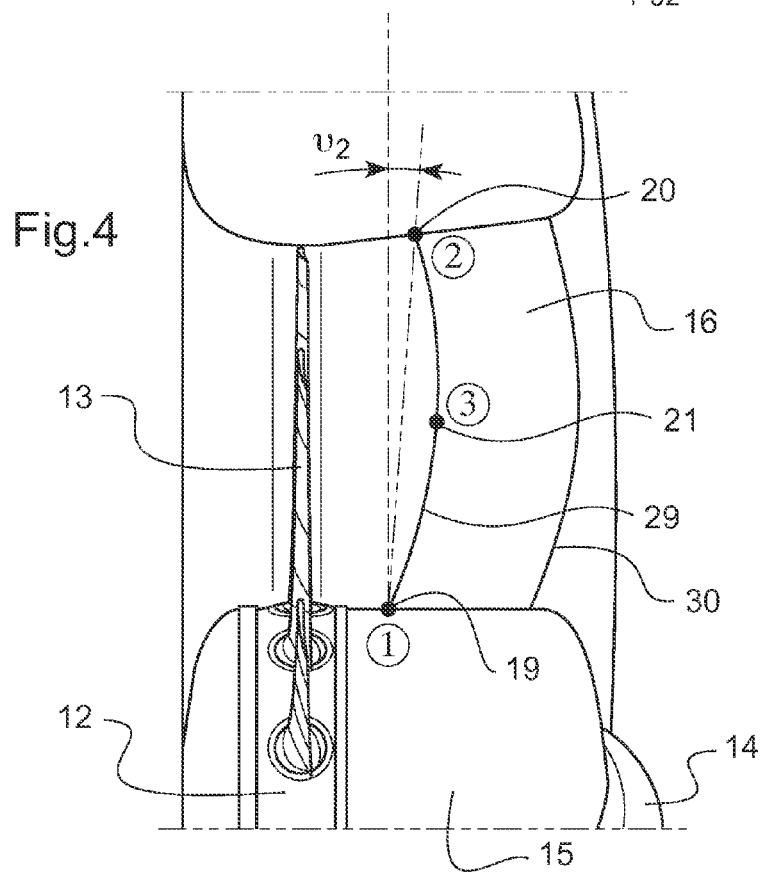
FIG. 4 shows a cross sectional view of the tail portion of the helicopter according to the invention.

According to FIG. 4 corresponding features are referred to with the references of FIG. 1-3. An angle $v_2$ relative to the rotor plane, defined by the rotor blades 13, of each of the first and second stator vanes 16, 17 is defined through a first point 19 at the root of each of the stator vanes 16, 17 at the gearbox fairing 15 and a second point 20 defined at each of the stator vane tips at the transverse duct 6. The first point 19 is closer to the rotor plane, than the second point 20. Each of the first and second stator vanes 16, 17 have a leading and a trailing edge 29, 30 with a parabolic shape. The parabolic shape of the leading edge 29 is defined by three points, namely the first point 19, the second point 20 and a third point 21 in between the first two points, preferable in a middle section of each of the stator vanes 16, 17. The angle $v_2=5°$ varies within $\pm2°$. The leading edge 29 is turned towards the rotor blades 13 and the trailing edge 30 is turned away from the rotor blades 13. Both the leading edge 29 and the trailing edge 30 with increasing radius are sloped away from the rotor plane, defined by the rotor blades 13.

The distance between the plane of the rotor blades 13 and the first point 19 is maximized depending on the width of the shroud 3. The distance between the plane of the rotor 10 and the third point 21 is again maximized while preventing the respective trailing edge 30 of each of the stator vanes 16, 17 from protruding from the shroud geometry. The third point 21 ranges from forming a straight leading edge 29 up to the before described constraint of the maximum distance. The shape of the respective trailing edges 30 of the stator vanes 16, 17 result from the spanwise chord distribution, being constant.

According to FIGS. 5 and 6 corresponding features are referred to with the references of FIG. 1-4. The drive shaft fairing 14 as casing for the drive shaft 23 and the control rod 24 for controlling the pitch angle of the transverse duct rotor blades 13 has an aerodynamic and acoustic optimized shape with an inner profile 22, based on a four digit NACA airfoil in order to reduce the aerodynamic and acoustic interferences between the rotor blades 13 and the drive shaft fairing 14. The drive shaft is connected with its one end to a main gear (not shown) of the helicopter and is connected to drivingly engage the hub rotor 12 with its end opposed to the one end.

The drive shaft fairing 14 has a reduced outer volume and a reduced cross section rejuvenating from a root at the central gearbox fairing 15 to an inner circumference of the transverse duct 6. The cross section of the drive shaft fairing 14 rejuvenates with a constant rate of 1% within a distance of 20 to 55 mm, preferably within 35 to 40 mm or 38 mm from the root at the central gearbox fairing 15 to the inner circumference of the transverse duct 6.

For safety reasons and to be conservative a minimum distance of 15 mm, said minimum distance being respectively indicated by corresponding circles 27 and 28, has to be maintained between the inner profile 22 of the drive shaft fairing 14 and each of the rotating drive shaft 23 and the moving control rod 24.

Depending on the flight state of the helicopter, the flow through the transverse duct 6 can be both from the transverse duct rotor to the transverse duct stator or from the transverse duct stator to the transverse duct rotor. Therefore a rounded edge 26 of the drive shaft fairing 14 is provided at the side of the drive shaft fairing 14 that is turned away from the rotor and a further rounded edge 25 of the drive shaft fairing 14 is provided at the side of the drive shaft fairing 14 that is turned to the rotor.

REFERENCE LIST

1 Transverse duct-type tail portion of a helicopter
2 counter-torque device
3 shroud
4 bumper
5 fin
6 transverse duct
12 rotor hub
13 rotor blades
14 drive shaft fairing
15 gearbox fairing
16 first stator vane
17 second stator vane
18 horizontal/longitudinal axis
19 first point of stator vane leading edge
20 second point of stator vane leading edge
21 third point of stator vane leading edge
22 cut through the drive shaft fairing
23 drive shaft
24 control rod
25 leading edge of drive shaft fairing
26 trailing edge of drive shaft fairing
27 safety distance to drive shaft
28 safety distance to control rod
29 leading edge of stator vane
30 trailing edge of stator vane

What is claimed is:

1. A helicopter with a longitudinal axis and with a tail portion with a transverse duct and a drive shaft inside a drive shaft fairing for a counter-torque device supported within said transverse duct, said counter-torque device including:
  - a rotor rotatable mounted within said transverse duct, said rotor including: a rotor hub having a rotor axis, and rotor blades extending from said rotor hub, said rotor blades having a modulated angular distribution about said rotor axis,
  - a stator fixedly mounted within said transverse duct offset along said rotor axis from said rotor, said stator including a plurality of stator vanes, wherein said stator vanes are angularly modulated such that the interferences between the rotor blades and the stator vanes are limited by avoiding that any angular difference between two rotor blades corresponds to any of the angular differences between two stator vanes or between any of the stator vanes and the drive shaft fairing,
  - the drive shaft originating from a main gear box and ending in a gear box in the transverse duct to drivingly engage with the rotor, and
  - a control rod to control pitch angles of the rotor blades wherein:
  - the rotor is rotational about a rotor axis, tilted in the range between −20° to +45° around a rotation axis parallel offset to the longitudinal axis of the helicopter or the drive shaft, said rotation axis going through the center of the rotor and being directed to the tail of the helicopter,
  - the distances between the plane of the rotor and points between a root and a tip at the transverse duct on leading or trailing edges of the stator vanes are greater than the distances between the plane of the transverse duct rotor and any points on a straight line between said root and said tip at the transverse duct of the leading or trailing edges of the stator vanes, a maximized distance for any points on the trailing edges of the stator vanes being defined by the width of the shroud, namely said trailing edges of the stator vanes are limited within a silhouette defined by said shroud, and
  - the drive shaft and the control rod are sheathed with an aerodynamic fairing.

2. The helicopter according to claim 1, wherein the maximum number of stator vanes equals six.

3. The helicopter according to claim 1, wherein the rotor axis is tilted about 1°.

4. The helicopter according to claim 1, wherein the distances between the plane of the rotor and the points between a root and a tip on leading or trailing edges of the stator vanes are defined by parabolic functions.

5. The helicopter according to claim 1, wherein the stator vanes are configured to carry both: tension and compression.

6. The helicopter according to claim 2, wherein the azimuthal positions and the incline of said two stator vanes are respectively given by $\theta_{v\text{-}01}=140°$, $v_{1\text{-}01}=25°$ and $\theta_{v\text{-}02}=255°$, $v_{1\text{-}02}=25°$.

7. The helicopter according to claim 4, wherein the parabolic shaped leading edge is defined using three points, a first point being defined at the root of the respective stator vane, a second point at the stator vane tip depending on the first point and an angle $v_2$ and a third point defined in between the first and the second point.

8. The helicopter according to claim 1, wherein the stator vanes are tilted with an angle $v_2=5°\pm2°$ relative to the rotor plane.

9. The helicopter according to claim 7, wherein the first point is closer to the rotor plane than the second point.

10. The helicopter according to claim 1, wherein the aerodynamic fairing is provided with at least one rounded edge.

11. The helicopter according to claim 6, wherein the azimuthal position relative to the rotation axis of the first and second stator vanes can vary in the range of $\theta_v=\pm40°$.

12. The helicopter according to claim 6, wherein the inclination of the first and second stator vanes relative to the radial direction from the gearbox fairing towards the transverse duct can vary in the range of $v_1=\pm20°$.

13. The helicopter according to claim 1, wherein positive values of $v_1$ are defined in the opposite direction from the direction of rotation of the rotor or in direction of rotation of the rotor.

14. The helicopter according to claim 1, wherein the drive shaft fairing has a reduced volume and/or a reduced cross section rejuvenating from the central gearbox fairing to an inner circumference of the transverse duct.

15. The helicopter according to claim 14, wherein the cross section of the drive shaft fairing rejuvenates with a constant rate of 1% within a distance of 20 to 55 mm from the root at the central gearbox fairing to the inner circumference of the transverse duct.

16. The helicopter according to claim 1, wherein the maximum number of stator vanes equals four.

17. The helicopter according to claim 1, wherein the maximum number of stator vanes equals two.

18. The helicopter according to claim 7, wherein the third point is defined in the middle section of the respective stator vane.

19. The helicopter according to claim 14, wherein the cross section of the drive shaft fairing rejuvenates with a constant rate of 1% within a distance of 35 to 40 mm from the root at the central gearbox fairing to the inner circumference of the transverse duct.

20. The helicopter according to claim 14, wherein the cross section of the drive shaft fairing rejuvenates with a constant rate of 1% within a distance of 38 mm from the root at the central gearbox fairing to the inner circumference of the transverse duct.

* * * * *